United States Patent
Shenfield et al.

(10) Patent No.: US 7,409,674 B2
(45) Date of Patent: Aug. 5, 2008

(54) SYSTEM AND METHOD OF CREATING AND COMMUNICATING WITH COMPONENT BASED WIRELESS APPLICATIONS

(75) Inventors: Michael Shenfield, Richmond Hill (CA); Viera Bibr, Kilbride (CA); Brindusa L. Fritsch, Toronto (CA); Bryan R. Goring, Milton (CA); Robert Kline, Richmond Hill (CA); Kamen B. Vitanov, Toronto (CA)

(73) Assignee: Research in Motion Limited, Waterloo, On ( * ) Notice: Subject to any disclaimer, the term of this patent is extended or adjusted under 35 U.S.C. 154(b) by 913 days.

(21) Appl. No.: 10/745,192

(22) Filed: Dec. 23, 2003

(65) Prior Publication Data

US 2004/0199614 A1    Oct. 7, 2004

Related U.S. Application Data

(60) Provisional application No. 60/503,955, filed on Sep. 17, 2003, provisional application No. 60/436,012, filed on Dec. 26, 2002.

(51) Int. Cl.
    *G06F 9/45* (2006.01)
(52) U.S. Cl. ..................................... 717/114
(58) Field of Classification Search .................. 717/114
    See application file for complete search history.

(56) References Cited

U.S. PATENT DOCUMENTS 7,152,090 B2 * 12/2006 Amirisetty et al. .......... 709/200

2002/0133811 A1   9/2002 Duftler et al.

OTHER PUBLICATIONS

Vuorimaa P et al: "A Java based XML browser for consumer devices" Symposium on Applied Computing. Proceedings of the 2002 ACM Symposium on Applied Computing, Mar. 11, 2002,-Mar. 14, 2002 pp. 1094-1099, XP002297076 Madrid, ES ISBN: 1-58113-445-2 the whole document.

(Continued)

*Primary Examiner*—John Chavis
(74) *Attorney, Agent, or Firm*—Jonathan Pollack; Growling Lafleur Henderson LLP

(57) ABSTRACT

A system and method of creating and communicating with wireless component applications is provided. Mobile communication devices communicate with a web service via a wireless network, the Internet, and optionally a message-map service. Each wireless component application is executed by a component framework on one of the mobile communication devices, and comprises data components, presentation components, message components, and workflow components. The component framework executes the component application in an application container which provides access to framework services which include a communication service, a screen service, a persistence service, an access service, a provisioning service, and a utility service. Messages can be sent from the component application to the message-map service, which converts each of the messages to a format required by the web service using an application message-map, and then sends the message to the web service. The web service sends a response to the message-map service, which converts the response to the format required by the wireless component application, and sends the response to the wireless component application.

44 Claims, 9 Drawing Sheets

OTHER PUBLICATIONS

US 2002/133811 A1 (Khalaf, Rania Y et al) Sep. 19, 2002 abstract paragraph '0013!—paragraph "0016! paragraph '0104!.

"PCT Notification of Transmittal of the International Search Report or the Declaration" for PCT International Application No. PCT/CA03/01981, Oct. 11, 2004, 6 pages, International Searching Authority.

"PCT Written Opinion" for PCT International Application No. PCT/CA03/01981, Nov. 2, 2004, 6 pages, International Preliminary Examining Authority.

"PCT Notification of Transmittal of the International Preliminary Examination Report" for PCT International Application No. PCT/CA03/01981, Apr. 5, 2005, 7 pages, International Preliminary Examining Authority.

"European Examination Report" for European Patent Application No. 03767367.0, Oct. 12, 2005, 4 pages, 1082-0277, European Patent Office.

Examination Report of European Patent Application No. 03767367.0, Apr. 25, 2006, 3 pages, European Patent Office.

Australian Examiner's First Report on Patent Application No. 2003291909, Feb. 9, 2007, 2 pages, Australilan Government.

* cited by examiner

SYSTEM AND METHOD OF CREATING AND COMMUNICATING WITH COMPONENT BASED WIRELESS APPLICATIONS

This application claims the benefit of U.S. provisional 60/436,012, filed Dec. 26, 2002 and further claims the benefit of U.S. provisional 60/503,955, filed Sep. 17, 2003, the entire disclosures of which are incorporated herein by reference.

BACKGROUND

This application relates generally to wireless communication and specifically to software for mobile communication devices.

There is a continually increasing number of mobile communication devices in use today, such as mobile telephones, PDAs with wireless communication capabilities, and two-way pagers. Software applications which run on these mobile communication devices increase their utility. For example, a mobile phone may include an application which retrieves the weather for a range of cities, or a PDA may include an application that allows a user to shop for groceries. These software applications take advantage of the mobility of these devices and connectivity to a wireless network in order to provide timely and useful services to users, regardless of where the users are. However, due to the restricted resources of mobile communications devices, such as memory, and the complexity of delivering data wirelessly to a mobile communication device, developing applications for mobile communications devices remains a difficult and time-consuming task.

Currently, mobile communication devices are configured to communicate with Web Services through Internet based Browsers and/or native applications. Browsers have the advantage of being adaptable to operate on a cross-platform basis for a variety of different devices, but have a disadvantage of requesting pages (screen definitions in HTML) from the Web Service, which hinders the persistence of data contained in the screens. A further disadvantage of Browsers is that the screens are rendered at runtime, which can be resource intensive. Native applications have the advantage of being developed specifically for the type of mobile device, thereby providing a relatively optimized application program for each runtime environment. However, native applications have disadvantages of not being platform independent, thereby necessitating the development of multiple versions of the same application, as well as being relatively large in size, thereby taxing the memory resources of the mobile device. There is a need for application programs that can be run on web service clients having a wide variety of runtime environments, as well as having a reduced consumption of mobile device resources.

The systems and methods as disclosed herein provide a component based application environment to obviate or mitigate at least some of the above presented disadvantages.

SUMMARY

Current application programs are not adaptable to be run on clients having a wide variety of runtime environments, and can undesirably consume too much of mobile device resources. Browsers are an application program that have a disadvantage of requesting pages (screen definitions in HTML) from a Web Service, which hinders the persistence of data contained in the screens. A further disadvantage of Browsers is that the screens are rendered at runtime, which can be resource intensive. Native applications are a further example of current application programs which have disadvantages of not being platform independent, thereby necessitating the development of multiple versions of the same application, as well as being relatively large in size, thereby taxing the memory resources of the mobile device. Contrary to current application programs, a system of creating and communicating with wireless component applications is provided. The system comprises mobile communication devices which communicate with a web service via a wireless network, the Internet, and/or optionally a message-map service. Each wireless component application has a series of components expressed in a structured definition language and a set of instructions, which are executed by a component framework on one of the mobile communication devices. The components can include one or more data components, presentation components, message components, and/or workflow components. The component framework executes the component application in an application container which provides access to generic framework services which include one or more of a communication service, a screen service, a persistence service, an access service, a provisioning service, and a utility service. Messages can be sent from the component application to the message-map service, which converts the messages to a format required by the web service using an application message-map, and then sends the messages to the web service. Responses to the messages can be sent to the message-map service, converted into the format required by the component application, and sent to the component application.

Further, the system of creating and communicating with wireless component applications also provides a method for deploying and communicating with a wireless component application. The method comprises steps of deploying the wireless component application to a mobile communication device, and deploying a message-map to a message-map service. The method can in some instances further comprise steps of sending a message to the message-map service, which uses the message-map to convert the message to the format required by a web service, and then sends the message to the web service. The method can also further comprise steps of sending a response from the web service to the message-map service, which converts the message to the format required by the wireless component application and sends the message to the wireless component application.

There is provided herein a mobile communication device configured for provisioning an executable version of a component application program received from a server over a network. The program has a plurality of components including metadata descriptors expressed in a structured definition language. The mobile device comprises: an infrastructure means for executing the executable version; an interface means coupled to the infrastructure means configured for communication with the executable version by a user of the device; a communications means coupled to the infrastructure means configured for communicating with the network; and a framework means configured for interfacing the executable version to the infrastructure means and for providing a client runtime environment for the executable version.

Also disclosed there is provided a computer program product for provisioning an executable version of a component application program on a mobile communication device. The program has a plurality of components including metadata descriptors expressed in a structured definition language. The computer program product comprises: a computer readable medium; a component framework module stored on the computer readable medium for interfacing the executable version to a device infrastructure including a processor and an associated memory; and an application container module coupled to the component framework module for generating the executable version from the metadata descriptors and for hosting a client runtime environment for the resultant executable version.

Also disclosed herein is a method of provisioning an executable version of a component application program on a mobile communication device. The method comprises the steps of: receiving a plurality of components over a network from a server, the plurality of components representing the component application program, the components including metadata descriptors expressed in a structured definition language; loading the metadata descriptors in an application container of the device, the application container for hosting a client runtime environment for the program; and generating the executable version from the metadata descriptors for subsequent execution in the client runtime environment of the device.

There is further disclosed a mobile communication device configured for provisioning an executable version of a component application program received from a server over a network. The program has a plurality of components including metadata descriptors expressed in a structured definition language. The mobile device comprises: a device infrastructure for operating the mobile device including a processor and an associated memory for executing the executable version; a user interface coupled to the device infrastructure having an input device and an output device configured for communication with the executable version; a communications device coupled to the device infrastructure and configured for connecting to a wireless transceiver to communicate with the network; and a component framework configured for interfacing the executable version to the device infrastructure and for providing a client runtime environment for the executable version.

BRIEF DESCRIPTION OF THE DRAWINGS

These and other features will become more apparent in the following detailed description in which reference is made to the appended drawings wherein.

DESCRIPTION

Figure 1:
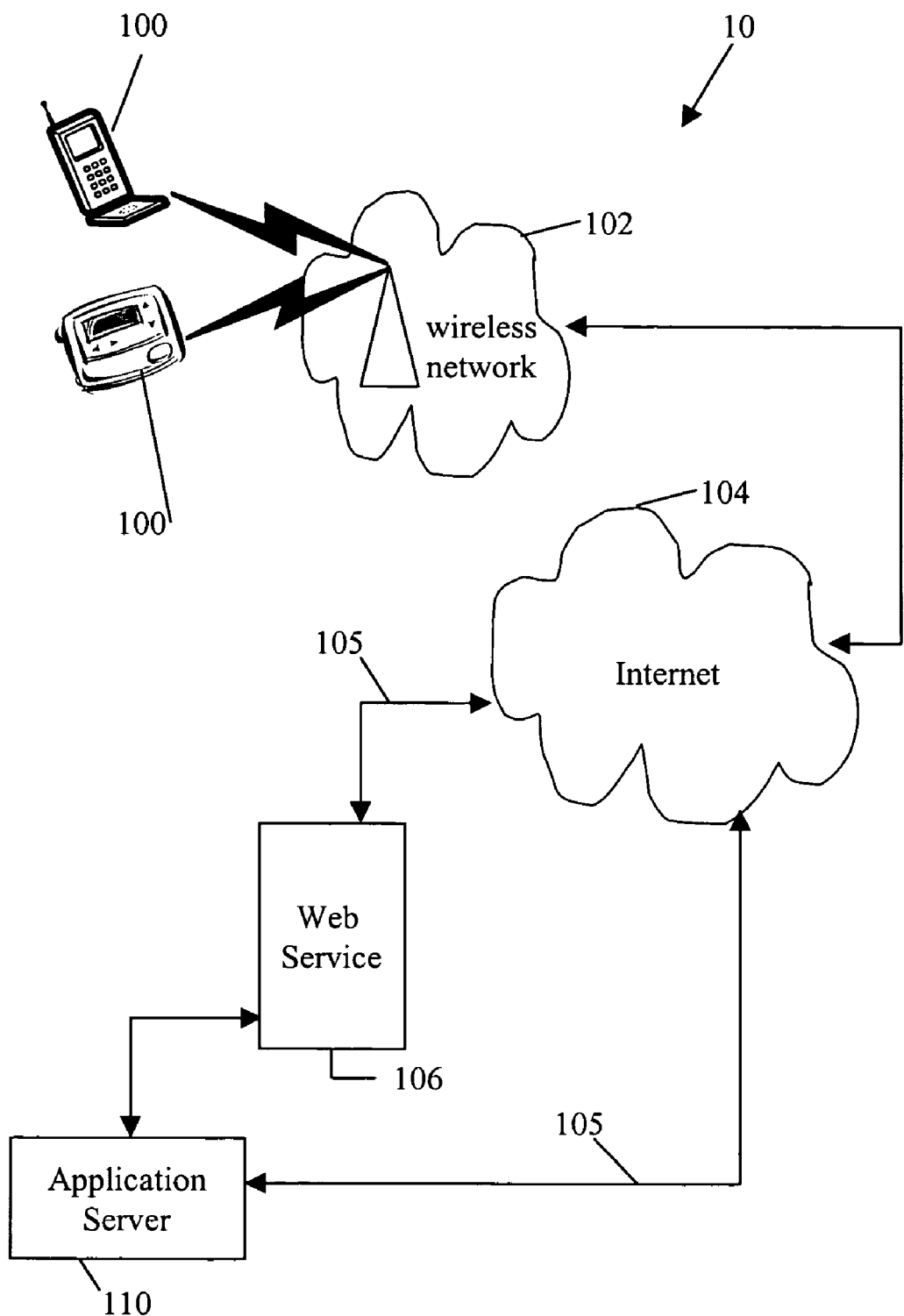
FIG. 1 is a block diagram of a communication system.

Referring to FIG. 1, a communication system 10 comprises mobile communication devices 100 for interacting with one or more web services provided by a web server 106 via a coupled wireless network 102 and the Internet 104. The mobile devices 100 transmit and receive requests/response messages 105, respectively, when in communication with the web services of the web server 106. The mobile devices 100 operate as web clients of the web services by using the requests/response messages 105 in the form of message header information and associated data content, for example requesting and receiving product pricing and availability from an on-line merchant. For satisfying the appropriate requests/response messages 105, the web server 106 communicates with an application server 110 through various protocols (such as but not limited to HTTP and component API) for exposing relevant business logic (methods) to client application programs 302 (see FIG. 2) of the mobile device 100. The application programs 302 of the mobile device 100 can use the business logic of the application server 110 similarly to calling a method on an object (or a function). It is recognized that the mobile devices 100 can communicate with one or more web servers 106 and associated application servers 110 via the wireless network 102. It is also recognized that the mobile devices 100 could be directly coupled to the application servers 110, thereby bypassing the web servers 106, if desired.

Figure 2:
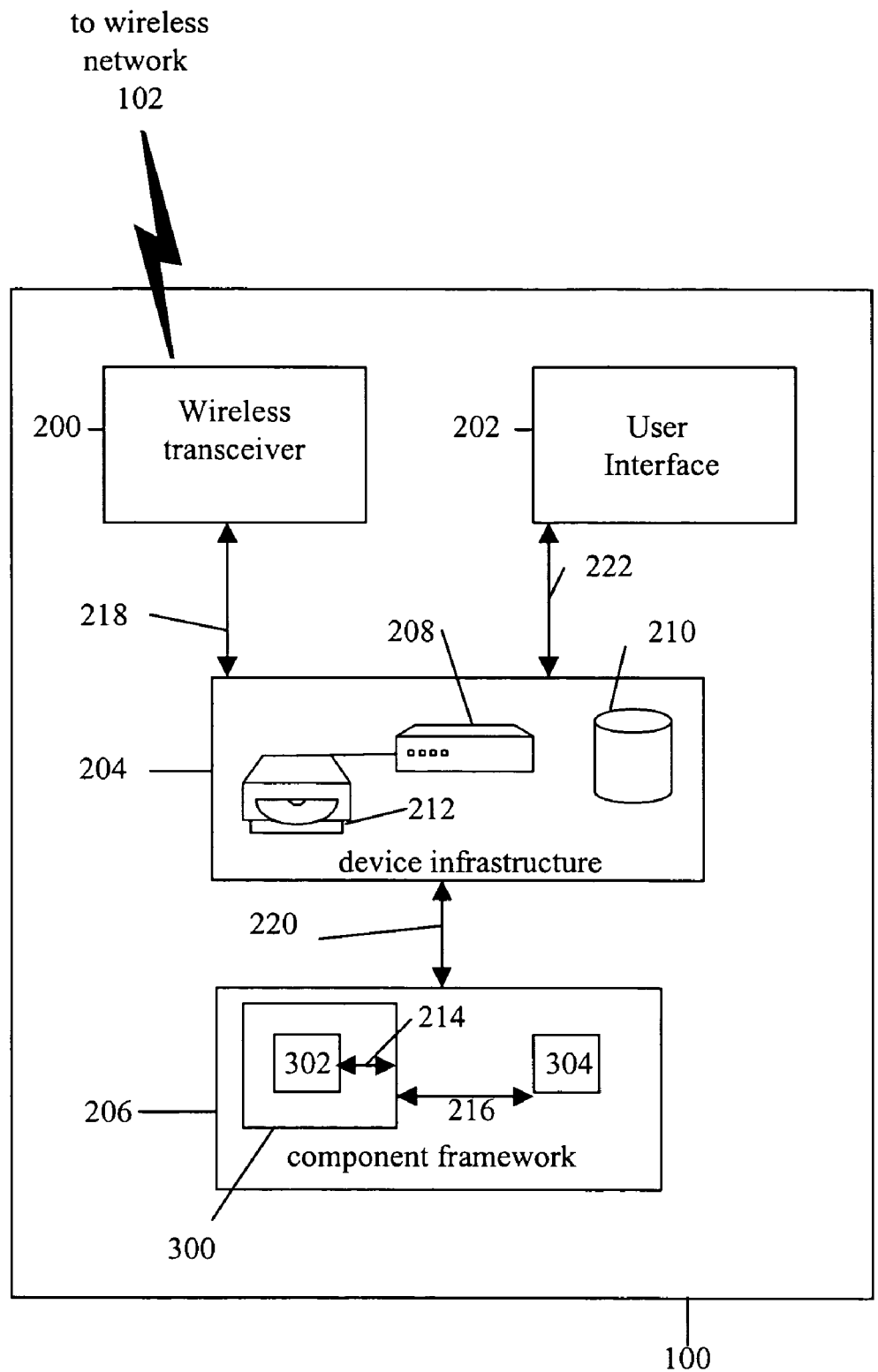
FIG. 2 is a block diagram of a mobile communication device of FIG. 1.
Figure 9:
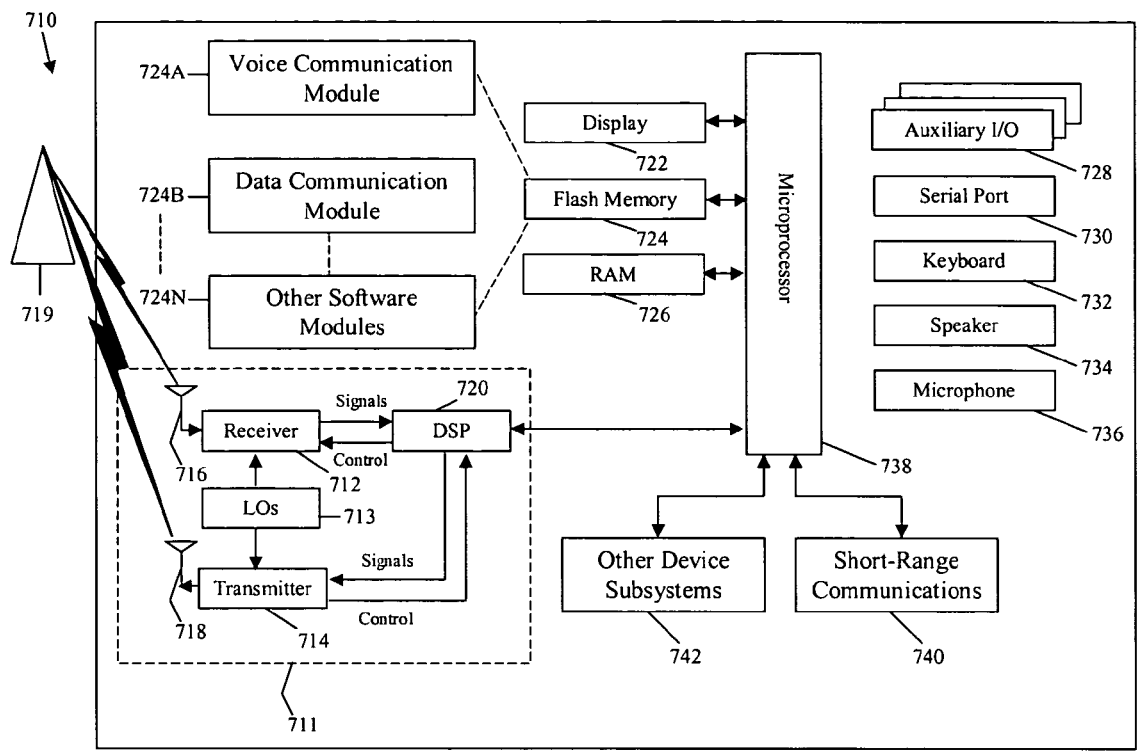
FIG. 9 is a block diagram of a further example of the mobile communication device of FIG. 2.

Referring to FIG. 2, the mobile communication device 100 are devices such as but not limited to mobile telephones, PDAs, two-way pagers or dual-mode communication devices (see FIG. 9). The mobile devices 100 include a wireless transceiver 200 coupled via connection 218 to a device infrastructure 204. The wireless transceiver 200 is connectable during operation of the mobile devices 100 to the wireless network 102 by a suitable wireless channel such as RF or IR links, which enable the mobile devices 100 to communicate with each other and with external systems (such as the web server 106) via the wireless network 102, and to coordinate the request/response messages 105 between the client application programs 302 and the servers 106, 110 (see FIG. 1). The wireless network 102 supports the transmission of data in the request/response messages 105 between devices and external systems, which are connected to the wireless network 102. The wireless network 102 may also support voice communication for telephone calls between the mobile communication devices 100 and devices which are external to the wireless network 102. A wireless data transmission protocol can be used by the wireless network 102, such as but not limited to DataTAC, GPRS or CDMA.

Referring again to FIG. 2, the mobile devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, and a user output device such as an LCD screen display. If the screen is touch sensitive, then the display can also be used as the user input device as controlled by the device infrastructure 204. The user interface 202 is employed by the user of the mobile device 100 to coordinate the request/response message messages 105 over the system 10 (see FIG. 1) as employed by client application programs 302 of a component framework 206, further described below.

Referring again to FIG. 2, operation of the mobile communication device 100 is enabled by the device infrastructure 204. The device infrastructure 204 includes a computer processor 208 and associated memory module 210. The computer processor 208 manipulates the operation of the wireless transceiver 200, the user interface 202 and the component framework 206 of the mobile communication device 100 by executing related instructions, which are provided by an operating system and client application programs 302 located in the memory module 210. Further, it is recognized that the device infrastructure 204 can include a computer readable storage medium 212 coupled to the processor 208 for providing instructions to the processor and/or to load/update client application programs 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid state memory card, or RAM provided in the memory module 210. It should be noted that the above listed example computer readable mediums 212 can be used either alone or in combination.

Referring again to FIG. 2, a component framework 206 of the mobile device 100 is coupled to the device infrastructure 204 by the connection 220. The component framework 206 provides a native runtime environment for the client application programs 302 and is an interface to the mobile device 100 functionality of the processor 208 and associated operating system of the device infrastructure 204. The component framework 206 provides the runtime environment preferably supplies a controlled, secure and stable environment on the mobile device 100, in which the component application programs 302 execute in an application container 300. The application container 300 can be referred to as a smart host container for the client application program 302, and can be responsible for analyzing message meta-data (e.g., of the messages 105—see FIG. 1) and for updating the representation of the meta-data in the memory module 210.

The component framework 206 also provides framework services 304 (a standard set of generic services such as but not limited to Communications, Screen, Data Persistence, Security) to the client application programs 302. The application program 302 has communications 214 with the application container 300, which coordinates communications 216 with the framework services 304. The framework services 304 of the component framework 206 coordinate communications via the connection 220 with the device infrastructure 204. Accordingly, access to the device infrastructure 204, user interface 202 and wireless transceiver 200 is provided to the client application programs 302 by the component framework 206. In addition, the client application programs 302 can be suitably virus-resistant, since the application containers 300 can control and validate all access of the communications 214, 216 of the component framework 206 to and from the client application programs 302. It is recognized that a portion of the operating system of the device infrastructure 204 (see FIG. 2) can represent the application container 300.

Referring again to FIG. 2, the client runtime environment of the component framework 206 is preferably capable of generating, hosting and executing the client application programs 302 (which are in the form of component applications—see below) from meta-data definitions. Further, specific functions of the component framework 206 can include support for language, coordinating memory allocation, networking, management of data during I/O operations, coordinating graphics on the output device of the user interface 202 via the device infrastructure 204 and providing access to core object oriented classes and supporting files/libraries. Examples of the runtime environments implemented by the component frameworks 206 can include such as but not limited to Common Language Runtime (CLR) by Microsoft and Java Runtime Environment (JRE) by Sun Microsystems. The runtime environment of the component framework 206 supports basic functions for the client application programs 302 on the mobile device 100, such as but not limited to:

provide a communications capability to send messages 105 to the Web Services of the web server 106 (see FIG. 1);

provide data input capabilities by the user on the input device to supply data parts for Web Services' outgoing messages 105 (messages to the service) of the web server 106 (see FIG. 1);

provide data presentation or output capabilities for Web Services' responses (incoming messages) or uncorrelated notifications of the web server 106 (see FIG. 1) on the output device; Provide data storage services to maintain local client data in the memory module 210; and provide an execution environment for a scripting language for coordinating operation of the application components 408 (see FIG. 3) of the client application programs 302.

Accordingly, referring to FIG. 2, the component framework 206 is used to execute the client application programs 302 (Web Service client applications) within the runtime environment and supports access to Web Service operations of the web servers 106 and associated application servers 110 (see FIG. 1), via the request/response messages 105. The component application programs 302 comprise software applications which are executed by the component framework 206. The component framework 206 creates the application container 300 for each component (e.g., 400, 402, 404, 406—see FIG. 3) of the application program 302, each time that the component application program 302 is executed. The application container 300 loads the components (e.g., 400, 402, 404, 406) of the application program 302 and can create native code which is executed by the processor 208 in the device infrastructure 204. The component framework 206 therefore provides the host application containers 300 for provisioning the definitions of the components such as 400, 402, 404, 406 to create the actual web client specific for each respective device infrastructure 204 of the communication devices 100.

Figure 3:
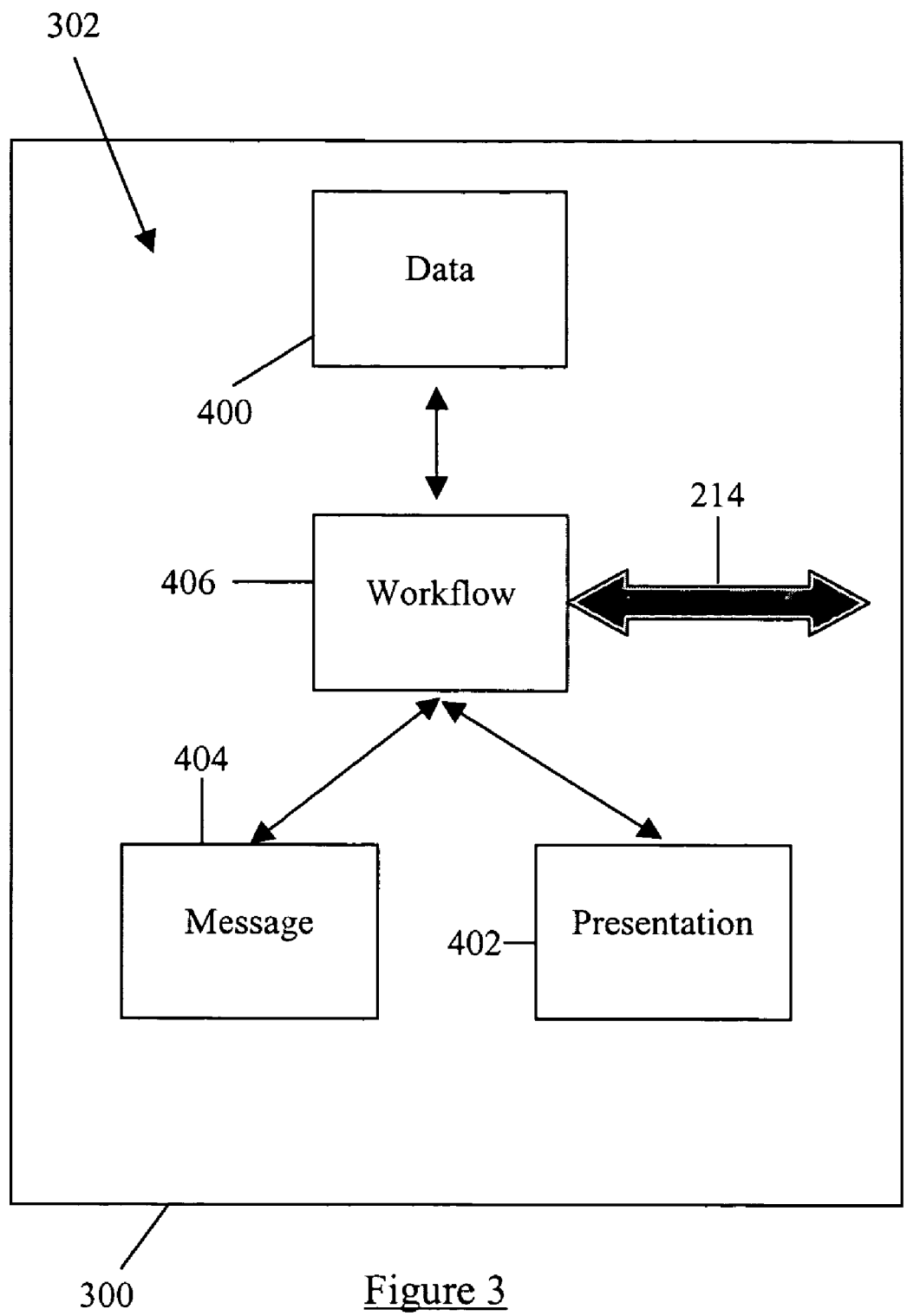
FIG. 3 is a block diagram of a component application program of FIG. 2.

Referring to FIG. 3, a block diagram of the component application program 302 can comprise the data components 400, the presentation components 402 and/or the message components 404, which are coordinated by workflow components 406 through communications 214 with the application container 300.

The data components 400 define data entities which are used by the component application program 302. Examples of data entities which data components 400 may describe are orders, users, and financial transactions. Data components 400 define what information is required to describe the data entities, and in what format the information is expressed. For example, the data component 400 may define such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400.

The message components 404 define the format of messages used by the component application program 302 to communicate with external systems such as the web service 106. For example, one of the message components 404 may describe such as but not limited to a message for placing an order which includes the unique identifier for the order, the status of the order, and notes associated with the order.

The presentation components 402 define the appearance and behavior of the component application program 302 as it displayed by the user interface 202. The presentation components 402 can specify GUI screens and controls, and actions to be executed when the user interacts with the component application 302 using the user interface 202. For example, the presentation components 402 may define screens, labels, edit boxes, buttons and menus, and actions to be taken when the user types in an edit box or pushes a button.

The workflow components 406 of the component application program 302 define processing that occurs when an action is to be performed, such as an action specified by a presentation component 402 as described above, or an action to be performed when messages 105 (see FIG. 1) arrive from the system 10. Screen workflow and message processing are defined by the workflow components 406. The workflow components 406 are written in a programming language or a scripting language, such as but not limited to ECMAScript, and can be compiled into native code and executed by the application container 300, as described above. An example of the workflow components 406 may be to assign values to data, manipulate screens, or send a message.

It is recognized that in the above described client component application program 302 definitions hosting model, the presentation components 402 (see FIG. 3) may vary depending on the client platform and environment of the mobile device 100 (see FIG. 1). For example, in some cases Web Service consumers do not require a visual presentation. The application definition of the components 400, 402, 404, 406 of the component application program 302 can be hosted in a Web Service registry as a bundle of platform-neutral data 400, message 404, workflow 406 component descriptors with a set of platform-specific presentation component 402 descriptors for various predefined client runtimes (i.e. specific component frameworks 206). When the discovery or deployment request message 105 (see FIG. 1) is issued the client type should be specified as a part of this request message 105. In order not to duplicate data, message, and workflow metadata while packaging component application programs 302 for different client platforms of the communication devices 100, application definitions can be hosted on the application server 110 (for example) as a bundle of platform-neutral component definitions linked with different sets of presentation components 402. When a user makes a discovery or download request message 105, the client runtime type of the communication devices 100 is validated and the proper bundle is constructed for delivery by the web server 106 to the device 100 over the wireless network 102. In some cases, the workflow components 406 can also be managed and deployed in a platform-specific representations; in this manner, known processing capabilities of particular platforms can be leveraged providing a more efficient and/or enhanced component application program 302 for the particular platform.

Accordingly, referring to FIG. 3, the client application programs 302 can be defined as a set of platform-neutral component definitions, namely for data 400 and message 404 components, and presentation components 402 using XML (or any other suitable structured definition language). The workflow components 406 can be defined using ECMAScript (or any other suitable platform-neutral scripting language). The client runtime environment of the component framework 206 (see FIG. 2) can generate component templates based on meta-definitions, as further described below, when the components 400, 402, 404, 406 of the component application program 302 are provisioned on the communication device 100. With a large variety of runtime environments, the cross-platform standards such as XML or ECMAScript are used to define application component metadata instead of pre-building the component application programs 302. This delayed binding can allow generic application definitions of the component application programs 302 to be run on a wide variety of system environments, represented by various different communication devices 100.

Expressing the data 400, message 404, and presentation 402 components using XML or its derivatives, and the workflow component 406 using the ECMAScript language or its subset, can allow an application developer to abstract the Web Service client from any specific platform or environment and implement in principle "develop once run everywhere" applications. The following example shows how a Web Services client application program 302 could be expressed using a structured definition language, such as but not limited to XML, and a platform neutral scripting/programming language, such as but not limited to ECMAScript, defined components:

Example XML Data Components 400

```
<data name="Order">
    <item name="orderId" type="Number" key="true"/>
    <item name="items" type="String" array="true"/>
    <item name="user" comp="true" compName="User"/>
    <item name="orderStatus" type="String"/>
</data>
...
```

Example XML Message Components 404

```
<msg name="ordConfirmation" type="response"
    action="mhConfirmation">
    <part name="orderId" type="String" />
    <part name="status" type="String" />
</msg>
...
```

Example XML Presentation Components 402

```
<screen name="scrConfirmation" title="Order Confirmation"
param="Order">
    <layout type="vertical">
        <widget type="label" value="Order Confirmation Result:"/>
        <widget type="edit" value="@Order.orderStatus"/>
    </layout>
    ...
    <menu>
        <item label="Continue" navigate="@scrMain"/>
        ...
    </menu>
</screen>
...
```

Example ECMAScript Workflow Components 406

```
<actions>
    <function name="mhConfirmation">
        key = ordConfirmation.orderId;
        order = Order.get(key);
        order.orderStatus = ordConfirmation.status;
        scrConfirmation.display(order);
    </function>
    ...
</actions>
```

Figure 4:
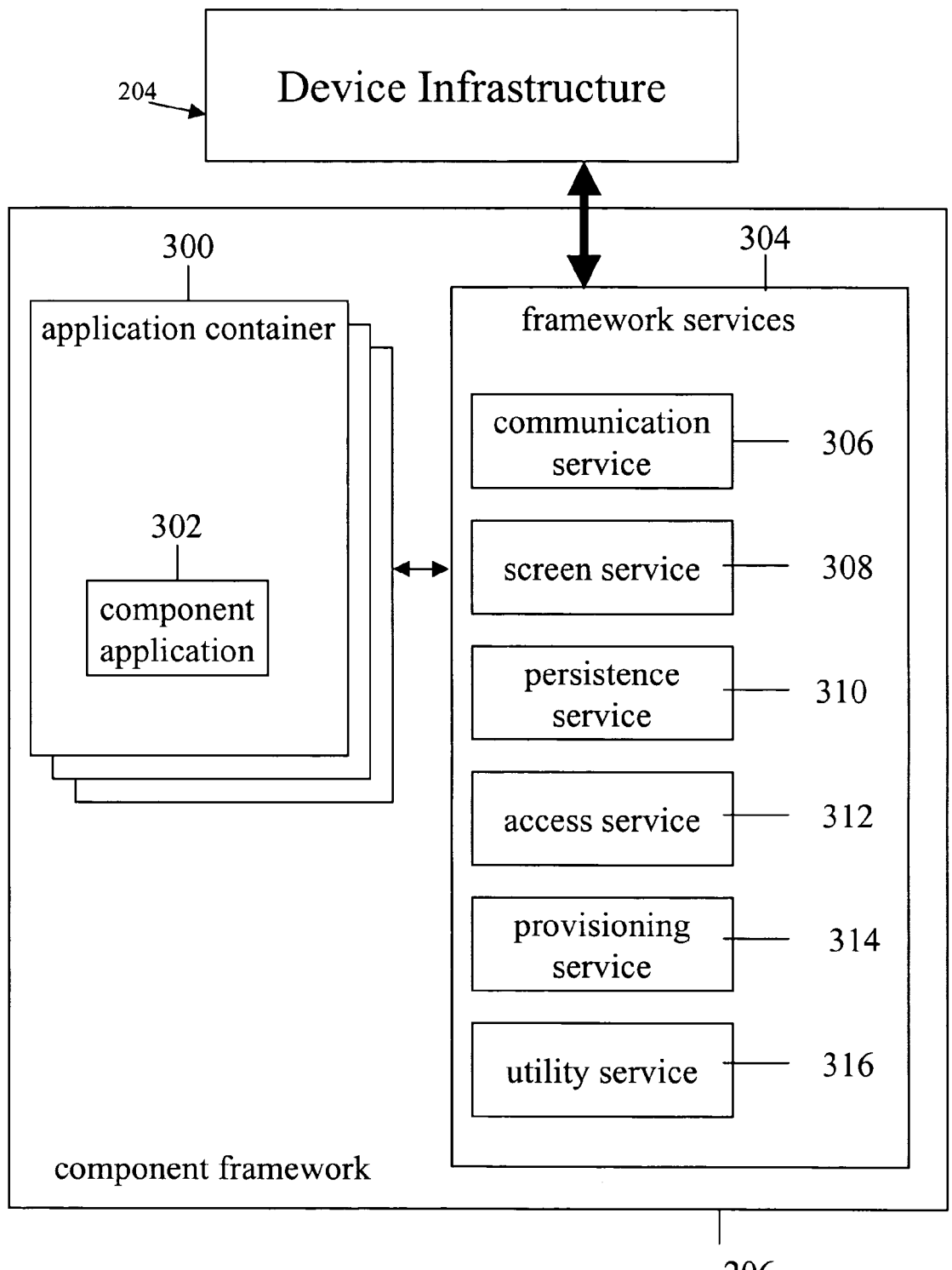
FIG. 4 is a block diagram of the component framework of FIG. 3.

Referring to FIG. 4, the above described components 400, 402, 404, 406 of the application program 302, once provisioned on the communication device 100, are given access to the predefined set of framework services 304 by the application containers 300 of the component framework 206. The framework services 304 include such as but not limited to a communication service 306, a screen service 308, a persistence service 310, an access service 312, a provisioning service 314 and a utility service 316.

Referring to FIGS. 1 and 4, the communication service 306 manages connectivity between the component application programs 302 and the external system 10, such as the web service 106. For example, messages 105 are sent to the web service 106 by the communication service 306 on behalf of the component applications 302. The communication service 306 also receives data of the messages 105 from the web service 106 and delivers the data to the component applications 302. Data received by the communication service 306 can include synchronous responses to requests made by the component application programs 302 and asynchronous data pushed to the mobile communication device 100 by the web service 106. The communication service 306 also manages connectivity when the mobile communication device 100 is disconnected from the wireless network 102. The mobile communication device 100 is disconnected from the wireless network when it is in an area which is not covered by the wireless network 102, or when the wireless transceiver is disabled. When the mobile communication device 100 is in disconnected mode, messages sent by the component applications 302 can be queued by the communication service 306, and sent once the mobile communication device 100 is reconnected to the wireless network 102.

Referring again to FIGS. 1 and 4, the screen service 308 manages the visual representation of the component application programs 302 as they are displayed on the output device of the user interface 202 (see FIG. 2). The visual representation can include images, graphical user interface (GUI) controls and windows, and text. The screen service 308 manages a screen stack, which controls what the user sees on the output device of the device infrastructure 204.

Referring again to FIGS. 1 and 4, the persistence service 310 allows the component application programs 302 to store data in the memory module 210 (see FIG. 2) of the device infrastructure 204. Database operations are provided by the persistence service 310 in a transparent fashion to the component application programs 302. Further, the runtime environment of the component framework 206 facilitates for actions performed on metadata (i.e. XML data) content of the messages 105, thereby providing for persistence of data.

Referring again to FIGS. 1 and 4, the access service 312 provides the component application programs 302 access to other software applications which are present on the mobile communication device 100. For example, the access service 312 may allow the component application programs 302, such as but not limited, to access a software application to send email, place a phone call, or access contact information which is stored in the memory module 210 (see FIG. 2). Access can be provided to other software applications on the communications device 100 in a secure manner. The access service 312 also allows other software applications which are present on the mobile communication device 100 to access the component application programs 302. It is recognized that the other software programs may be part of the operating system of the device infrastructure 204 (see FIG. 2).

Referring again to FIGS. 1 and 4, the provisioning service 314 manages the provisioning of software applications on the mobile communication device 100. Application provisioning includes requesting and receiving new and updated component application programs 302, configuring component application programs 302 for access to services which are accessible via the wireless network 102, modifying the configuration of component application programs 302 and services, and removing component application programs 302 and services. The provisioning service 314 performs steps required to provision software applications on behalf of the component application programs 302.

Referring again to FIGS. 1 and 4, the component application programs 302 use the utility service 316 to accomplish a variety of common tasks. For example, the utility service 316 can perform data manipulation such as conversion of strings to different formats on behalf of the component application programs 302.

It is recognized that the framework services 304 of the communication device 100 provide functionality to the component application programs 302, which can include the services described above. As a result, the component application programs 302 have access to the functionality of the communication device 100 without having to implement it. Since the functionality provided by the framework services 304 is core functionality that is present in most typical wireless applications, each currently available hard coded wireless application undesirably contains code to implement some or all of the services described above. For example, if there are ten hard coded wireless applications on a typical mobile device, then current known technology dictates that there may be ten copies of the same code for performing a service such as displaying a GUI or accessing the wireless network.

In contrast, the component framework 206 of the mobile communication device 100 (see FIG. 2) has only preferably one copy of the code which implements these services present in the framework services 304, regardless of the number of component application programs 302 which are present. Since code duplication of the framework services 304 is minimized, the size of the component application programs 302 can be reduced, as compared to currently available hard coded applications. The component application programs 302 thus can consume less memory and can require less time to transmit via the wireless network 102. This can optimize the component application programs 302 for use on the mobile communication devices 100, which are typically constrained with respect to memory and processing capabilities. In addition, software application developers do not need to spend time and effort implementing any of the functionality which is offered by the framework services 304 of the component framework 206.

The client runtime of the component framework 206 loads the metadata contained in the component 400, 402, 404, 406 definitions and the builds the executable version of the application program 302 on the communication device 100, via the application container 300. For example, there are two operational models for client runtime: template-based native execution and metadata-based execution. With the template-based native execution model the runtime hosts data, message, and screen templates pre-built on the communication device 100 using the native code. When the application program 302 definition is loaded, the client environment provided by the component framework 206 fills the templates with metadata-defined parameters and builds the executable client application program 302 in the native format. The workflow script (e.g., ECMAScript) of the workflow component 406 could be either converted to native code or executed using an interpreter to native code redirector (e.g., ECMAScript to native code), where the redirector interprets calls to the scripting language into operations on native components. With the metadata-based execution, the runtime environment of the component framework 206 either keeps component 400, 402, 404, 406 definitions in a representation format such as XML, which are parsed during execution time or uses native representation of XML (for example) nodes. During execution, a native runtime engine operates on definitions of the components 400, 402, 404, 406 rather than on native component entities. It is recognized that the template based approach can be more performance efficient over the metadata based execution, but can require a more sophisticated execution environment and more memory resources.

Before each component application 302 is loaded onto the mobile communication device 100, the workflow components 406 can be compiled into native code or an intermediate form such as Java™ bytecodes. The intermediate form is then converted into native code on the mobile communication device 100. Compiling the workflow components 406 before they are loaded onto the mobile communication device 100 can help ensure that the code comprising the workflow components 406 only has to be interpreted at one level on the mobile communication device 100. Alternatively, workflow components 406 may be loaded onto the mobile communication device 100 as code written in an interpreted language, which is processed by an interpreter on the mobile communication device 100 before it is converted into native code. Workflow components 406 may alternatively be comprised of code written in any compiled or interpreted language.

In order to create a component application 302 which has access to the framework services 304 which are described above, and which capitalizes on the benefits of operating in a mobile environment in order to provide utility to a user, an application developer can create components as described above. Standard technologies can be used, including extensible Markup Language (XML) for the data components 400, presentation components 402, and message components 404, and ECMAScript for the workflow components 406. The components are then executed in an application container 300 by the component framework 206, which executes the workflow components 406 and interprets the presentation components 402, data components 400 and message components 404 using the framework services 304 which are described above. This application development model helps to minimize the expertise required for application programmers and to minimize the amount of time required to create software application for mobile communication devices 100. In addition, once components have been created, they can be reused in multiple component applications 302, further facilitating development.

Figure 5:
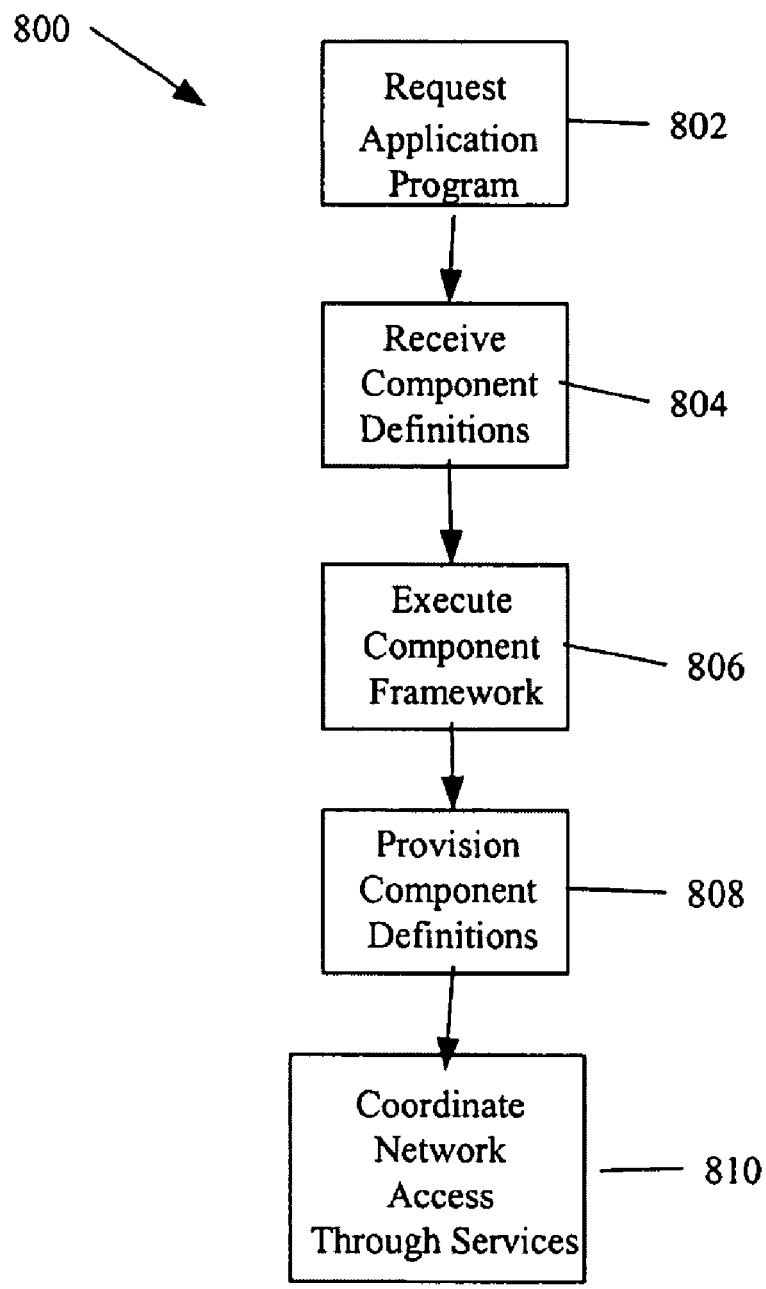
FIG. 5 is a flowchart of an example operation of the mobile device of FIG. 2.

Referring to FIGS. 1 and 5, operation 800 of the component application program 302 model is shown. The user of the mobile device 100 contacts and then requests 802 the selected application program 302 from the web service, by sending the request message 105 over the network 102. The appropriate web server 106 directs the request message 105 to the appropriate application server 110, and then sends 804 a set of component definitions in the response message 105 over the network 102 to the mobile device 100. The response message 105 includes the component application program 302 in the form of a series of data components 400, message components 404, and presentation components 402 (see FIG. 3) including meta data descriptors expressed in a structured definition language, such as but not limited to XML. The response message 105 also includes workflow components 406 including descriptors expressed in a programming/scripting language, such as but not limited to ECMAScript. The mobile device 100 provides 806 the runtime environment for the application program 302 through the component framework 206 (see FIG. 2), and thereby provisions 808 the components 400, 402, 404, 406 definitions of the application program 302 using an execution model to create the corresponding web client on the mobile device 100 for the contacted web service. The provisioned application program 302 uses the framework services 304 (see FIG. 2) for coordinating access of the mobile device 100 through messages 105 over the network 102. The user of the mobile device 100 interacts with the provisioned application program 302 through the user interface 202.

The component application model described above further facilities development of wireless applications, since the component applications 302 can be created visually using an integrated development environment (IDE), which is not shown. The IDE is a software application that allows an application developer to create the components described above quickly, using a GUI which presents the developer with a visual representation of components. Presentation components 402, data components 400, and message components 404 are displayed in a tree-view. Developers drag-and-drop components to add them to the component application 302. Icons representing presentation components 402 are clicked on to open an editor for designing the presentation components 402. Links between presentation components 402 are represented visually, and are clicked on to edit workflow components 406 which define screen workflow. Presentation components 402 are designed using an interface which includes a representation of the mobile communication device 100 on which the component application 302 is to run. Menu items are represented, and are clicked on to define workflow components 406 which are executed when the menu items are selected. Message components 404 can be visually mapped to data components 400. Message components 404 can also be visually associated with a web service 106 message, and a message component 404 can be created based on a web service 106 message such as defined in WSDL.

Figure 6:
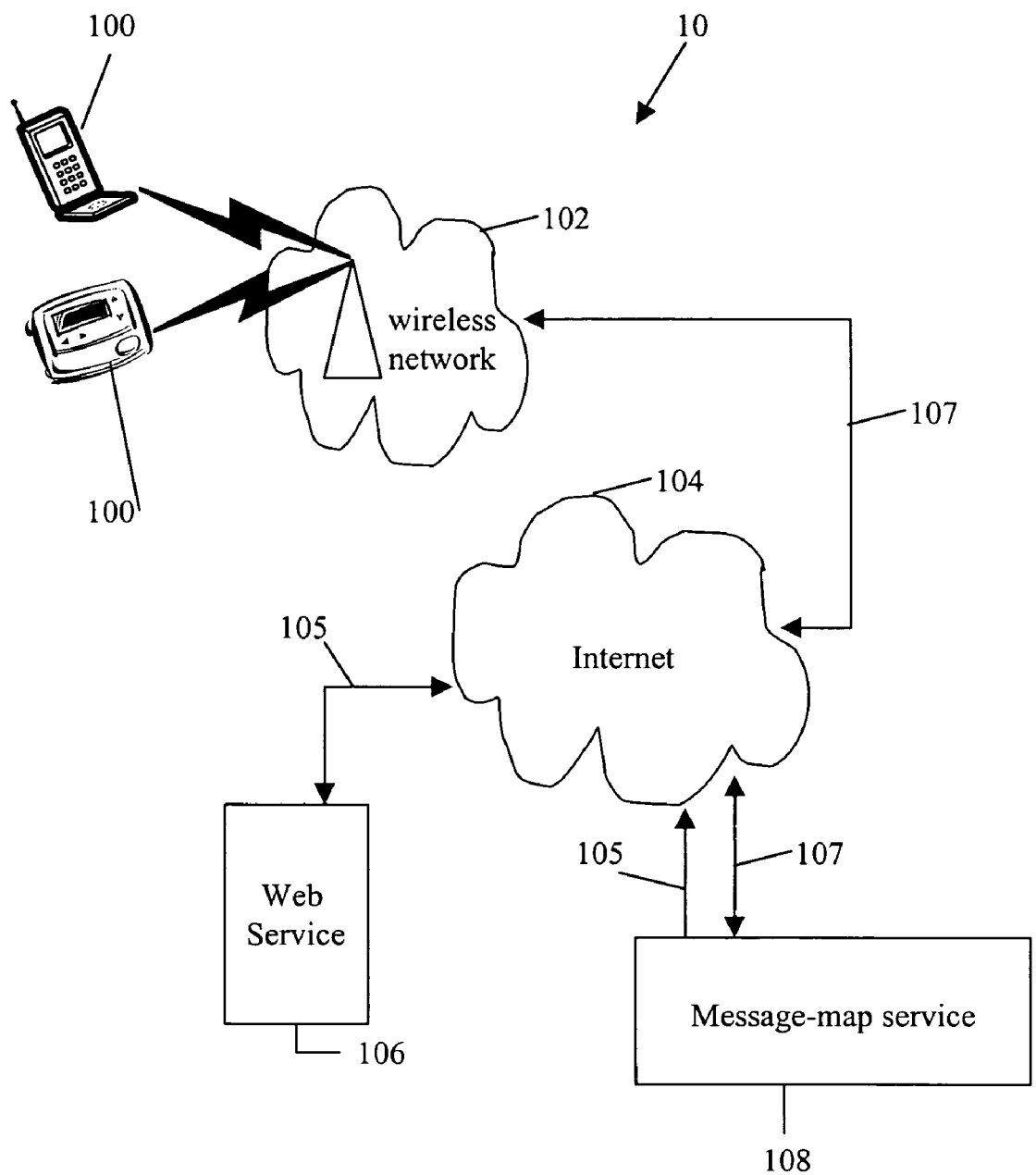
FIG. 6 is a further example of the communication system of FIG. 1.
Figure 7:
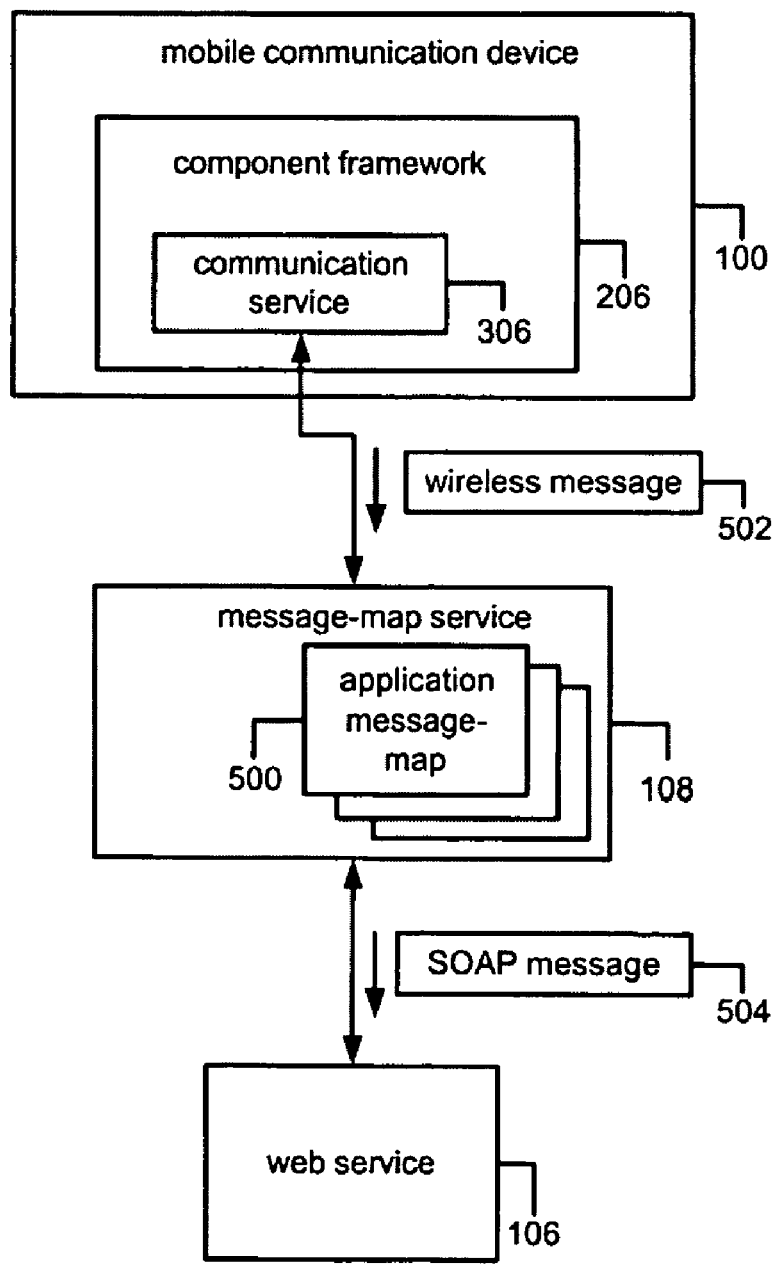
FIG. 7 is a block diagram of a messaging system using a message-map service of FIG. 6.

Referring to FIGS. 6 and 7, a further example of the system 10 includes a messaging system using a message-map service 108. Also shown are the web service on the web server 106, the communication service 306, the component framework 206 and the mobile communication device 100. For simplicity, other elements are not shown.

The wireless network 102 is connected to the Internet 104 such that the mobile communication devices 100 can transfer data of messages 107 to and from systems which are connected to the Internet 104. The connection between the wireless network 102 and the Internet 104 includes an Internet gateway (not shown) which enables data to flow from devices which are connected to the wireless network 102, such as the mobile communication devices 100, to systems which are connected to the Internet 104, such as a web service.

The web service on the web server 106 provides information which is used by software applications 302 (see FIG. 2) on the mobile communication devices 100. Alternatively, or in addition, the web service may receive and use information provided by software applications on the mobile communication devices 100, or perform tasks on behalf of software applications on the mobile communication devices 100. The web service implements an interface with the software application 302 on the mobile communication device 100 that can be expressed using Web Services Description Language (WSDL), and communicates with client systems using an appropriate communication protocol such as the Simple Object Access Protocol (SOAP). Alternatively, the web service may use other known protocols.

The web service is an example of a system with which software applications on the mobile communication devices 100 interact via the wireless network 102 and the Internet 104 in order to provide utility to users of the mobile communication devices 100. Messages 107 sent between the mobile communication devices 100 and the web service traverse the message-map service 108. The message-map service 108 converts messages 107 from a format which is usable by software applications on the mobile communication devices 100 to the format which is required by the web service, thereby producing messages 105. Once the message 107 from one of the mobile communication device 100 is converted to the appropriate format, the message-map service 108 transmits the message 105 onto the web service. Similarly, once the message or response 105 from the web service is converted to the required format, the message-map service 108 transmits the message 107 onto one of the mobile communication devices 100. The message-map service 108 is described in more detail in FIG. 7.

Referring to FIG. 7, in order to interact with the web service in order to exchange information, the component application 302 (see FIG. 2) sends a wireless message 502 via the wireless network 102 and the Internet 104 using the communication service 306. For example, the wireless message 502 is formatted according to one of the message components 404 (see FIG. 3) defined in the component application 302. In order to access the web service, for example, a SOAP message 504 is used. In order to resolve the differing message types, the message-map service 108 receives the wireless message 502, constructs the corresponding SOAP message 504, and sends the SOAP message 504 to the web service on the web server 106 via the Internet 104 using the appropriate SOAP protocol. Similarly, the response message 504 generated by the web service is sent using SOAP to the message-map service 108 via the Internet 104, where it is converted into the corresponding wireless message 502 formatted according to one of the message components 404, and sent to the mobile communication device 100 where it is received by the communication service 306 on behalf of the component application 302.

Referring again to FIG. 7, the message-map service 108 includes an application message-map 500 for each component application 302 (see FIG. 2). The application message-map 500 defines how each wireless message 502 received from the component application 302 is converted into the corresponding web service message such as SOAP message 504, and how each web service message, such as SOAP message 504, received from the web service which is to be sent to the component application 302 is converted into the corresponding wireless message 502. As described above, each wireless message 502 can be formatted according to one of the message components 404 in the component application 302, while each web service message (e.g., SOAP message 504) can be formatted according to a definition of the web service. The message-map 500 specifies which information defined in the definition corresponds to information defined in the message component 404 of the application program 302. These definitions can be encoded in a suitable format such as WSDL. This mapping is then used to convert messages 502, 504 between the two formats.

It is recognized that it is not necessary for all of the information in the SOAP message 504 to be mapped to information in the corresponding wireless message 502. For example, in conversion to the SOAP message 504 from the wireless message 502, the application message-map 500 may specify default values to provide in the SOAP message 504 where there is no corresponding information in the wireless message 502. Similarly, when converting to the wireless message 502 from the SOAP message 504, information in the SOAP message 504 for which there is no corresponding definition in the wireless message 502 is discarded. Therefore, information which is included in responses from the web service which is not utilized by the component application 302 may not be transmitted over the wireless network 102. Similarly, information which is required in the SOAP message 504 sent to the web service which is the same each time the message 504 is sent by the component application 302 is defaulted, so that the redundant information is not transmitted over the wireless network 102. As a result, less data can be transmitted over the wireless network 102, reducing congestion of the wireless network 102, and the amount of resources required to process the messages 502 on the mobile communication device 100 can be reduced.

Accordingly, the message-map service 108 enables component applications 302 to integrate with web services without having the web messaging service protocol (e.g., SOAP) being implemented on the mobile communication device 100. The component applications 302 also do not need to format messages 502 for use by web services, or to perform any other additional processing in order to integrate with existing web services 106.

As an alternative to using the message-map service 108, messages 502, 504 may be mapped by the communication service 306 on the mobile communication device 100. In this example, software having the web messaging service protocol such as kSOAP having SOAP protocol definitions is installed on the mobile communication device 100 so that the communication service 306 can communicate directly with the web service 106. Effectively, the translation of the messages 502 occurs at the mobile device 100, rather than using an intermediate third party to implement the message-map service 108.

Figure 8:
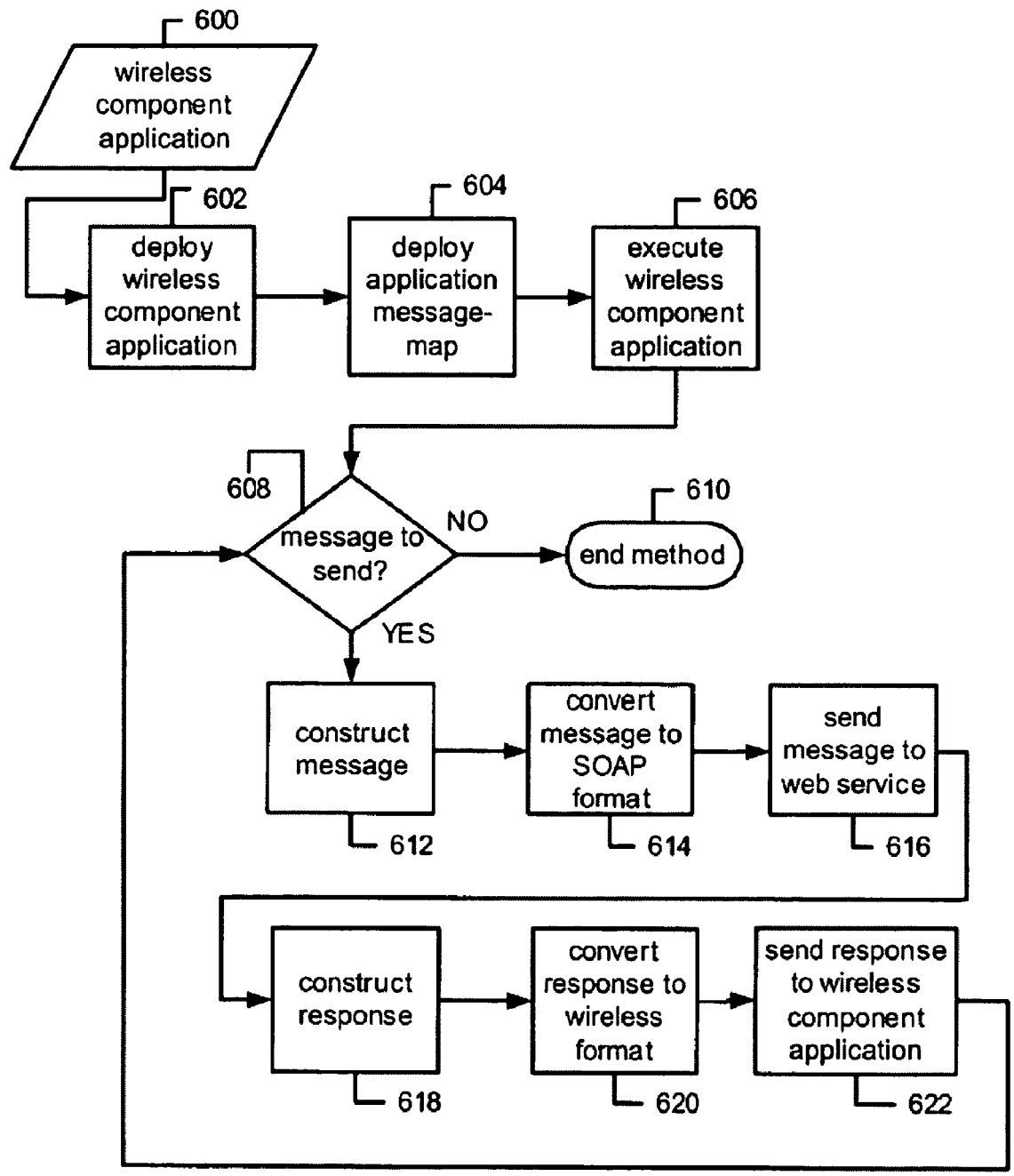
FIG. 8 is a flowchart illustrating a method of operating a wireless component application of the communication device of FIG. 6.

FIG. 8 is a flowchart illustrating a method of deploying and communicating with a wireless component application 600. The wireless component application 600 is a component application 302 as described above, comprising data components 400, presentation components 402, message components 404, and workflow components 406 (see FIG. 3).

Referring to FIGS. 6 and 8, the method begins at step 602 where the wireless component application 600 is deployed to the mobile communication device 100. The wireless component application 600 is transmitted over the air via the wireless network 102 to the mobile communication device 100. Alternatively, the wireless component application 600 may be loaded onto the mobile communication device 100 over a serial connection, a USB link, or a short-range communication system such Bluetooth™ or an 802.11 network (not shown).

Referring again to FIGS. 6 and 8, the method continues with step 604 of deploying the application message-map 108. As described above, the application message-map 108 is used to convert messages from the format used by the wireless component application 600 to the format required by the web service with which the wireless component application 600 is communicating. The application message-map 500 (see FIG. 7) is deployed to the dedicated message-map service 108 which is accessible via the Internet 104. Alternatively, the application message-map 108 may be deployed directly to the mobile communication device 100. Step 606 executes the wireless component application 600 on the mobile communication device 100. As described above, the application framework 206 (see FIG. 2) on the mobile communication device 100 creates the application container 300 and executes the wireless component application 600 in the container 300, which provides the wireless component application 600 access to framework services 304.

Referring again to FIGS. 6 and 8, once the wireless component application 600 is executing on the mobile communication device 100, the method continues with step 608, where it is determined whether the wireless component application 600 wishes to send the wireless message 502 to the external web service. The wireless component application 600 sends messages 502 to the web service in order to request data from the web service, to transfer data to the web service, or to request that the web service perform an action on behalf of the wireless component application 600. Where it is determined that the wireless component application 600 has no more messages 502 to send, the method ends at step 610. Otherwise, the method continues with step 612 of constructing the message 502 to send. The message 502 is constructed by the communication service according to the format defined in one of the message components 404 (see FIG. 3). The communication service then transmits the message 502 over the wireless network 102.

Referring again to FIGS. 6 and 8, at step 614, the message 502 is received by the message-map service 108 via the wireless network 102 and the Internet 104. The message-map service 108 then converts the message 502 into SOAP format using the application message-map 500 deployed at step 604. The application message-map 500 specifies which parts of the SOAP format required by the web service correspond to each part of the message 502 from the wireless component application 600. At step 616, the converted message 504 is then transmitted over the Internet 104 to the web service using the SOAP protocol. Alternatively, at step 614, the message 502 may be converted to the SOAP format using the application message-map 500 located on the mobile communication device 100, and then transmitted directly to the web service via the wireless network 102 and the Internet 104 using the kSOAP protocol at step 616.

Referring again to FIGS. 6 and 8, once the message 504 is received by the web service, the method continues at step 618 where the web service constructs the response to the message 504. The response in SOAP format is transmitted to the message-map service 108 via the Internet 104, where it is converted to the wireless format 502 required by the wireless component application 600 at step 620. The required wireless format is defined in one of the message components 404 (see FIG. 3) included in the wireless component application 600. The message-map service 108 then transmits the response to the wireless component application 600 at step 622 via the Internet 104 and the wireless network 102. Alternatively, the web service may transmit the SOAP response message 504 directly to the mobile communication device 100, where it is converted into the required format at step 620 using the application message-map 500 resident on the mobile communication device 100. The converted message 502 is then given to the wireless component application 600 at step 622. The method then continues with step 608, where it is determined whether there are more messages 502 to send. If there are no more messages 502, then the method concludes at step 610. It is recognized that the method of deploying and communicating with a wireless component application 600 may contain fewer or more steps than those shown in FIG. 8.

FIG. 9 is a block diagram of a dual-mode mobile communication device 710, which is a further example of the device 100 of FIGS. 1 and 6. The dual-mode mobile communication device 710 includes a transceiver 711, a microprocessor 738, a display 722, Flash memory 724, RAM memory 726, auxiliary input/output (I/O) devices 728, a serial port 730, a keyboard 732, a speaker 734, a microphone 736, a short-range wireless communications sub-system 740, and may also include other device sub-systems 742. The transceiver 711 preferably includes transmit and receive antennas 716, 718, a receiver 712, a transmitter 714, one or more local oscillators 713, and a digital signal processor 720. Within the Flash memory 724, the dual-mode mobile communication device 710 preferably includes a plurality of software modules 724A-724N that can be executed by the microprocessor 738 (and/or the DSP 720), including a voice communication module 724A, a data communication module 724B, and a plurality of other operational modules 724N for carrying out a plurality of other functions.

The dual-mode mobile communication device 710 is preferably a two-way communication device having voice and data communication capabilities. Thus, for example, the dual-mode mobile communication device 710 may communicate over a voice network, such as any of the analog or digital cellular networks, and may also communicate over a data network. The voice and data networks are depicted in FIG. 9 by the communication tower 719. These voice and data networks may be separate communication networks using separate infrastructure, such as base stations, network controllers, etc., or they may be integrated into a single wireless network.

The communication subsystem 711 is used to communicate with the voice and data network 719, and includes the receiver 712, the transmitter 714, the one or more local oscillators 713 and may also include the DSP 720. The DSP 720 is used to send and receive signals to and from the transmitter 714 and receiver 712, and is also utilized to receive control information from the transmitter 714 and to provide control information to the receiver 712. If the voice and data communications occur at a single frequency, or closely-spaced set of frequencies, then a single local oscillator 713 may be used in conjunction with the transmitter 714 and receiver 712. Alternatively, if different frequencies are utilized for voice communications versus data communications, then a plurality of local oscillators 713 can be used to generate a plurality of frequencies corresponding to the voice and data networks 719. Although two antennas 716, 718 are depicted in FIG. 9, the dual-mode mobile communication device 710 could be used with a single antenna structure. Information, which includes both voice and data information, is communicated to and from the communication module 711 via a link between the DSP 720 and the microprocessor 738. The detailed design of the communication subsystem 711, such as frequency band, component selection, power level, etc., is dependent upon the communication network 719 in which the dual-mode mobile communication device 710 is intended to operate. For example, a dual-mode mobile communication device 710 intended to operate in a North American market may include a communication subsystem 711 designed to operate with the Mobitex™ or DataTAC™ mobile data communication networks and also designed to operated with any of a variety of voice communication networks, such as AMPS, TDMA, CDMA, PCS, etc., whereas a device 710 intended for use in Europe may be configured to operate with the General Packet Radio Service (GPRS) data communication network and the GSM voice communication network. Other types of data and voice networks, both separate and integrated, may also be utilized with the dual-mode mobile communication device 710.

Depending upon the type of network or networks 719, the access requirements for the dual-mode mobile communication device 710 may also vary. For example, in the Mobitex and DataTAC data networks, mobile devices are registered on the network using a unique identification number associated with each device. In GPRS data networks, however, network access is associated with a subscriber or user of a mobile device. A GPRS device typically requires a subscriber identity module ("SIM"), which is required in order to operate a dual-mode mobile communication device on a GPRS network. Local or non-network communication functions (if any) may be operable, without the SIM, but a dual-mode mobile communication device will be unable to carry out any functions involving communications over the data network 719, other than any legally required operations, such as 911 emergency calling.

After any required network registration or activation procedures have been completed, the dual-mode mobile communication device 710 may then send and receive communication signals, including both voice and data signals, over the network 719 (or networks). Signals received by the antenna 716 from the communication network 719 are routed to the receiver 712, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 720. In a similar manner, signals to be transmitted to the network 719 are processed, including modulation and encoding, for example, by the DSP 720 and are then provided to the transmitter 714 for digital to analog conversion, frequency up conversion, filtering, amplification and transmission to the communication network 719 (or networks) via the antenna 718. Although a single transceiver 711 is shown in FIG. 9 for both voice and data communications, it is possible that the dual-mode mobile communication device 710 may include two distinct transceivers, a first transceiver for transmitting and receiving voice signals, and a second transceiver for transmitting and receiving data signals.

In addition to processing the communication signals, the DSP 720 also provides for receiver and transmitter control. For example, the gain levels applied to communication signals in the receiver 712 and transmitter 714 may be adaptively controlled through automatic gain control algorithms implemented in the DSP 720. Other transceiver control algorithms could also be implemented in the DSP 720 in order to provide more sophisticated control of the transceiver 711.

The microprocessor 738 preferably manages and controls the overall operation of the dual-mode mobile communication device 710. Many types of microprocessors or microcontrollers could be used here, or, alternatively, a single DSP 720 could be used to carry out the functions of the microprocessor 738. Low-level communication functions, including at least data and voice communications, are performed through the DSP 720 in the transceiver 711. Other, high-level communication applications, such as a voice communication application 724A, and a data communication application 724B may be stored in the Flash memory 724 for execution by the microprocessor 738. For example, the voice communication module 724A may provide a high-level user interface operable to transmit and receive voice calls between the dual-mode mobile communication device 710 and a plurality of other voice devices via the network 719. Similarly, the data communication module 724B may provide a high-level user interface operable for sending and receiving data, such as e-mail messages, files, organizer information, short text messages, etc., between the dual-mode mobile communication device 710 and a plurality of other data devices via the network 719. In the dual-mode mobile communication device 710, a component framework 206 as described above may also be implemented as a software module or application, or incorporated into one of the software modules 724A-724N.

The microprocessor 738 also interacts with other dual-mode mobile communication device subsystems, such as the display 722, Flash memory 724, random access memory (RAM) 726, auxiliary input/output (I/O) subsystems 728, serial port 730, keyboard 732, speaker 734, microphone 736, a short-range communications subsystem 740 and any other dual-mode mobile communication device subsystems generally designated as 742.

Some of the subsystems shown in FIG. 9 perform communication-related functions, whereas other subsystems may provide resident or on-device functions. Notably, some subsystems, such as keyboard 732 and display 722 may be used for both communication-related functions, such as entering a text message for transmission over a data communication network, and device-resident functions such as a calculator or task list or other PDA type functions.

Operating system software used by the microprocessor 738 is preferably stored in a persistent store such as Flash memory 724. In addition to the operating system, which controls all of the low-level functions of the dual-mode mobile communication device 710, the Flash memory 724 may include a plurality of high-level software application programs, or modules, such as a voice communication module 724A, a data communication module 724B, an organizer module (not shown), or any other type of software module 724N. The Flash memory 724 also may include a file system for storing data. These modules are executed by the microprocessor 738 and provide a high-level interface between a user of the dual-mode mobile communication device and the mobile device. This interface typically includes a graphical component provided through the display 722, and an input/output component provided through the auxiliary I/O 728, keyboard 732, speaker 734, and microphone 736. The operating system, specific dual-mode mobile communication device software applications or modules, or parts thereof, may be temporarily loaded into a volatile store, such as RAM 726 for faster operation. Moreover, received communication signals may also be temporarily stored to RAM 726, before permanently writing them to a file system located in the persistent store 724.

An exemplary application module 724N that may be loaded onto the dual-mode mobile communication device 710 is a personal information manager (PIM) application providing PDA functionality, such as calendar events, appointments, and task items. This module 724N may also interact with the voice communication module 724A for managing phone calls, voice mails, etc., and may also interact with the data communication module for managing e-mail communications and other data transmissions. Alternatively, all of the functionality of the voice communication module 724A and the data communication module 724B may be integrated into the PIM module.

The Flash memory 724 preferably provides a file system to facilitate storage of PIM data items on the dual-mode mobile communication device 710. The PIM application preferably includes the ability to send and receive data items, either by itself, or in conjunction with the voice and data communication modules 724A, 724B, via the wireless network 719. The PIM data items are preferably seamlessly integrated, synchronized and updated, via the wireless network 719, with a corresponding set of data items stored or associated with a host computer system, thereby creating a mirrored system for data items associated with a particular user.

The dual-mode mobile communication device 710 may also be manually synchronized with a host system by placing the dual-mode mobile communication device 710 in an interface cradle, which couples the serial port 730 of the dual-mode mobile communication device 710 to the serial port of the host system. The serial port 730 may also be used to enable a user to set preferences through an external device or software application, or to download other application modules 724N for installation. This wired download path may be used to load an encryption key onto the dual-mode mobile communication device 710, which is a more secure method than exchanging encryption information via the wireless network 719.

Additional application modules 724N may be loaded onto the dual-mode mobile communication device 710 through the network 719, through an auxiliary I/O subsystem 728, through the serial port 730, through the short-range communications subsystem 740, or through any other suitable subsystem 742, and installed by a user in the Flash memory 724 or RAM 726. Such flexibility in application installation increases the functionality of the dual-mode mobile communication device 710 and may provide enhanced on-device functions, communication-related functions, or both. For example, secure communication applications may enable electronic commerce functions and other such financial transactions to be performed using the dual-mode mobile communication device 710.

When the dual-mode device 710 is operating in a data communication mode, a received signal, such as a text message or a web page download, will be processed by the transceiver 711 and provided to the microprocessor 738, which will preferably further process the received signal for output to the display 722, or, alternatively, to an auxiliary I/O device 728. A user of the dual-mode mobile communication device 710 may also compose data items, such as email messages, using the keyboard 732, which is preferably a complete alphanumeric keyboard laid out in the QWERTY style, although other styles of complete alphanumeric keyboards such as the known DVORAK style may also be used. User input to the dual-mode mobile communication device 710 is further enhanced with a plurality of auxiliary I/O devices 728, which may include a thumbwheel input device, a touchpad, a variety of switches, a rocker input switch, etc. The composed data items input by the user may then be transmitted over the communication network 719 via the transceiver 711.

When the dual-mode mobile communication device 710 is operating in a voice communication mode, the overall operation of the dual-mode mobile communication device 710 is substantially similar to the data mode, except that received signals are preferably be output to the speaker 734 and voice signals for transmission are generated by a microphone 736. Alternative voice or audio I/O subsystems, such as a voice message recording subsystem, may also be implemented on the dual-mode mobile communication device 710. Although voice or audio signal output is preferably accomplished primarily through the speaker 734, the display 722 may also be used to provide an indication of the identity of a calling party, the duration of a voice call, or other voice call related information. For example, the microprocessor 738, in conjunction with the voice communication module and the operating system software, may detect the caller identification information of an incoming voice call and display it on the display 722.

A short-range communications subsystem 740 is also included in the dual-mode mobile communication device 710. For example, the short-range communications subsystem 740 may include an infrared device and associated circuits and components, or a short-range wireless communication module such as a Bluetooth™ module or an 802.11 module to provide for communication with similarly-enabled systems and devices. Those skilled in the art will appreciate that "Bluetooth" and 802.11 refer to sets of specifications, available from the Institute of Electrical and Electronics Engineers (IEEE), relating to wireless personal area networks and wireless LANs, respectively.

The above description relates to one or more exemplary systems and methods. Many variations will be apparent to those knowledgeable in the field, and such variations are within the scope of the application. For example, although the example above describes a web service which implements the SOAP protocol, the web service can be any information source accessible to the mobile communication device, and it may implement a different communication protocol.

Although the disclosure herein has been drawn to one or more exemplary systems and methods, various modifications thereof will be apparent to those skilled in the art without departing from the spirit and scope of the invention as outlined in the claims appended hereto.

We claim:

1. A method of provisioning an executable version of a component application program on a mobile communication device, the method comprising the steps of:
   receiving a plurality of components over a network from a server, the plurality of components representing the component application program, the components including metadata descriptors expressed in a structured definition language;
   loading the metadata descriptors in an application container of the device, the application container for hosting a client runtime environment for the program; and
   generating the executable version from the metadata descriptors for subsequent execution in the client runtime environment of the device.

2. The method according to claim 1, wherein the application container is provided by a component framework, the component framework providing an interface for the executable version to an infrastructure of the device including a processor and a memory.

3. The method according to claim 2, wherein the application container is a part of the operating system of the device infrastructure.

4. The method according to claim 2 further comprising the step of creating a second application container by the component framework for hosting a second component application program in a respective second client runtime environment.

5. The method according to claim 4 further including the step of coupling the executable version to a set of generic services on the device.

6. The method according to claim 5, wherein the generic services are predefined as a standard set of framework services provided by the component framework.

7. The method according to claim 5, wherein the predefined framework services are selected from the group comprising; communication, presentation, persistence, access, provisioning, and utility.

8. The method according to claim 7, wherein the framework services are configured for sharing with the components from a plurality of the component application programs.

9. The method according to claim 2, wherein the client runtime environment of the application container represents the executable version as a client of the server.

10. The method according to claim 9 further comprising the step of executing the executable version in native code by a template based execution model, the model employing a number of predefined templates configured for populating with the metadata descriptors of the components.

11. The method according to claim 10 further comprising the step of populating the predefined templates with metadata defined parameters associated with the metadata descriptors and using the populated templates for building the executable version in the native code.

12. The method according to claim 10, wherein the predefined templates are provided for the plurality of components selected from the group comprising; data components, message components, and presentation components.

13. The method according to claim 12 further comprising the step of receiving a workflow component of the component application program over a network, the workflow component including a set of instructions for coordinating the operation of the components having the metadata descriptors expressed in the structured definition language.

14. The method according to claim 13 further comprising the step of the application container providing the client runtime environment for the set of instructions.

15. The method according to claim 14, wherein the executable version includes an executable set of the instructions selected from the group comprising; instructions converted to native code, and instructions interpreted using a language interpreter with a native code redirector.

16. The method according to claim 14, wherein the structured definition language is expressed in XML and the set of instructions is expressed in ECMA Script.

17. The method according to claim 9 further comprising the step of executing the executable version by a metadata based execution model, the model configured for keeping the metadata definitions in the structured definition language for parsing during execution.

18. The method according to claim 9 further comprising the step of executing the executable version by a metadata based execution model, the model configured for using a native representation of structured definition language nodes during execution.

19. The method according to claim 9 further comprising the step of analyzing message data received by the application container from the server and updating the representation of the metadata in the memory of the device.

20. The method according to claim 19 further comprising the step of monitoring communications by the application container between the executable version and the component framework.

21. The method according to claim 20, wherein the application container monitors processing of the message data including operations selected from the group comprising; memory allocation of the message data, management of the message data during I/O, and message data presentation on a user interface of the device.

22. A mobile communication device configured for provisioning an executable version of a component application program received from a server over a network, the program having a plurality of components including metadata descriptors expressed in a structured definition language, the mobile device comprising:
 a device infrastructure for operating the mobile device including a processor and an associated memory for executing the executable version;
 a user interface coupled to the device infrastructure having an input device and an output device configured for communication with the executable version;
 a communications device coupled to the device infrastructure and configured for connecting to a wireless transceiver to communicate with the network; and
 a component framework configured for interfacing the executable version to the device infrastructure and for providing a client runtime environment for the executable version.

23. The mobile communication device according to claim 22 further comprising an application container provided by the component framework, the application container for providing the client runtime environment for the executable version.

24. The mobile communication device according to claim 23 further comprising the application container configured for executing the executable version by a metadata based execution model, the model keeping the metadata definitions in the structured definition language for parsing during execution.

25. The mobile communication device according to claim 23 further comprising the application container configured for executing the executable version by a metadata based execution model, the model using a native representation of structured definition language nodes during execution.

26. The mobile communication device according to claim 23, wherein the application container analyzes message data received from the server and updates the representation of the metadata in the memory of the device.

27. The mobile communication device according to claim 26, wherein the application container monitors communications between the executable version and the component framework.

28. The mobile communication device according to claim 27, wherein the application container monitors processing of the message data including operations selected from the group comprising; memory allocation of the message data, management of the message data during I/O, and message data presentation on the user interface of the device.

29. The mobile communication device according to claim 23, wherein the application container is a part of the operating system of the device infrastructure.

30. The mobile communication device according to claim 23, wherein the component framework is configured for a plurality of application containers for hosting respective ones of the component application programs in respective client runtime environments.

31. The mobile communication device according to claim 30 further comprising the executable version coupled to a set of generic services on the device.

32. The mobile communication device according to claim 31, wherein the generic services are predefined as a standard set of framework services provided by the component framework.

33. The mobile communication device according to claim 31, wherein the predefined framework services are selected from the group comprising; communication, presentation, persistence, access, provisioning, and utility.

34. The mobile communication device according to claim 33, wherein the framework services are configured for sharing with the components from a plurality of the component application programs.

35. The mobile communication device according to claim 23, wherein the client runtime environment of the application container represents the executable version as a client of the server.

36. The mobile communication device according to claim 35 further comprising the application container configured for executing the executable version in native code by a template based execution model, the model employing a number of predefined templates configured for populating with the metadata descriptors of the components.

37. The mobile communication device according to claim 36, wherein the predefined templates are configured for populating with metadata defined parameters associated with the metadata descriptors and the populated templates are configured for building the executable version in the native code.

38. The mobile communication device according to claim 36, wherein the predefined templates are provided for the plurality of components selected from the group comprising; data components, message components, and presentation components.

39. The mobile communication device according to claim 38 further comprising the program having a workflow component including a set of instructions for coordinating the operation of the components having the metadata descriptors expressed in the structured definition language.

40. The mobile communication device according to claim 39, wherein the application container provides the respective client runtime environment for the set of instructions.

41. The mobile communication device according to claim 40, wherein the executable version includes an executable set of the instructions selected from the group comprising; instructions converted to native code, and instructions interpreted using a language interpreter with a native code redirector.

42. The mobile communication device according to claim 40, wherein the structured definition language is expressed in XML and the set of instructions is expressed in ECMA Script.

43. A mobile communication device configured for provisioning an executable version of a component application program received from a server over a network, the program having a plurality of components including metadata descriptors expressed in a structured definition language, the mobile device comprising:

an infrastructure means for executing the executable version;
an interface means coupled to the infrastructure means configured for communication with the executable version by a user of the device;
a communications means coupled to the infrastructure means configured for communicating with the network; and
a framework means configured for interfacing the executable version to the infrastructure means and for providing a client runtime environment for the executable version.

44. A computer program product for provisioning an executable version of a component application program on a mobile communication device, the program having a plurality of components including metadata descriptors expressed in a structured definition language, the computer program product comprising:

a computer readable medium;
a component framework module stored on the computer readable medium for interfacing the executable version to a device infrastructure including a processor and an associated memory; and
an application container module coupled to the component framework module for generating the executable version from the metadata descriptors and for hosting a client runtime environment for the resultant executable version.

* * * * *